United States Patent [19]

Holland et al.

[11] Patent Number: 5,412,433
[45] Date of Patent: May 2, 1995

[54] SECONDARY COLOR CORRECTOR

[75] Inventors: David E. Holland, Granada Hills; Gavin W. Schutz, Glendale, both of Calif.

[73] Assignee: Image Transform Inc., North Hollywood, Calif.

[21] Appl. No.: 101,352

[22] Filed: Aug. 2, 1993

[51] Int. Cl.⁶ .......................... H04N 9/64; H04N 9/68; H04N 9/69
[52] U.S. Cl. ...................................... 348/650; 348/649
[58] Field of Search ..................... 358/27, 28, 29, 30; 340/703; H04N 9/64, 9/68, 9/69; 348/649, 645, 646, 647, 650

[56] References Cited

U.S. PATENT DOCUMENTS 4,679,072 7/1987 Takayama ........................ 358/27
4,788,586 11/1988 Eckenbrecht ..................... 358/27

FOREIGN PATENT DOCUMENTS

4106305 7/1992 Germany ..................... H04N 9/64
4106306 9/1992 Germany ..................... H04N 9/64
3266586 11/1991 Japan ........................... H04N 9/64

Primary Examiner—James J. Groody
Assistant Examiner—Glenton B. Burgess
Attorney, Agent, or Firm—Lyon & Lyon

[57] ABSTRACT

An improved method and apparatus for color correction normalizes two of the three color signals as a function of the third. In the preferred embodiment, an image comprising red, green and blue (RGB) signals are converted to a luminance Y signal, a saturation signal and a hue signal. The luminance and saturation signals are normalized as a function of hue. In the most preferred embodiment, for all fully saturated colors, the luminance values are normalized to a value of 0.5, and the saturation values to unity for all values of hue. The normalized values of saturation and luminance are utilized with the hue value in a secondary color corrector. The color corrected values of saturation and luminance are denormalized as a function of color corrected hue. Optionally, the color corrected luminance, saturation and hue may be converted to RGB signals for output. In one aspect of this invention, the normalized luminance signal is not used for relatively small values of saturation. In another aspect of this invention, multiple color correction regions are provided on an image. Overlapping regions are assigned priorities.

34 Claims, 8 Drawing Sheets

SECONDARY COLOR CORRECTOR

FIELD OF THE INVENTION

This invention is generally directed to the field of color correction. More particularly, it is directed to color correction for video and film post-production, especially for use with secondary color correction systems.

BACKGROUND OF THE INVENTION

It is often necessary or desirable to change all or part of an image from one color to another. Images may be taken from many sources, such as motion picture film, video cameras, or computers graphics to name a few. Ordinarily, color correction involves minor color changes. For example, it might be desirable to change an apple from one shade of red to another shade of red. However, more extreme examples may arise, such as where it is desired to change an apple from red to green.

In its most basic form, color correction may involve changes to the totality of the image. For example, it is possible to change the black level, or the white level of an image, or to change the gamma, which changes the shape of the curve in between.

Secondary color correction permits changing a particular hue (or color) to another hue. Devices are commercially available for performing such secondary color correction. In the post-production television and film industry, a person who operates a color corrector is called a colorist. Early versions of secondary color correctors permitted changing various components of red, green and blue (RGB) and yellow, cyan and magenta (YCM). More advanced versions permit dividing colors into a fraction of the spectrum, for example, selecting one color of a spectrum divided into 1024 segments, and changing merely that selected color.

In addition to changing that selected color, it was also possible to select a given box or region within the image, and to affect the color solely within that box or region. In certain cases, the boundaries were made to be fuzzy, thereby providing no sharp demarkation in color correction of the image.

Figure 1:
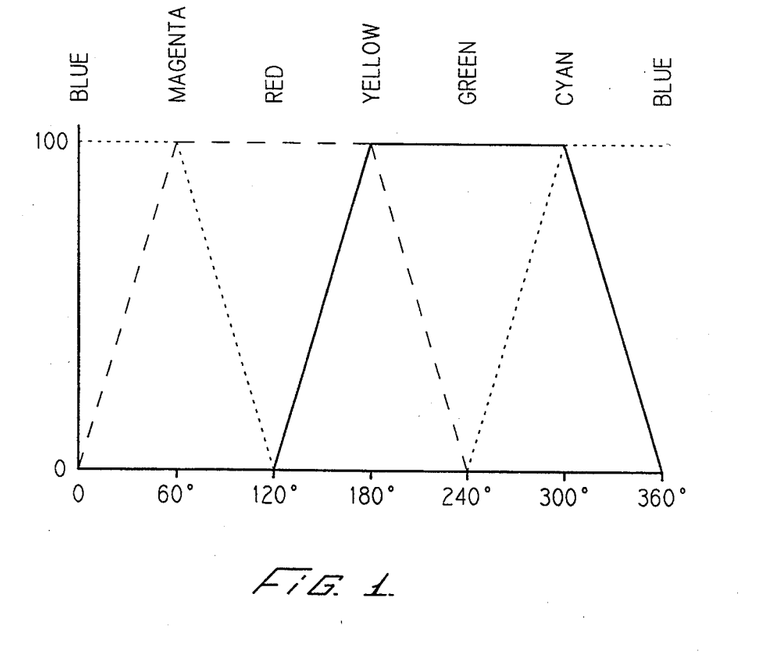
FIG. 1 shows the RGB components for a fully saturated color sweep.

By way of background, colors may be generated by some combination of red, green and blue (RGB). FIG. 1 shows a fully saturated color sweep in which the percentage of blue is shown in small dashed line, the percentage of green in shown in solid line and the percentage of red is shown in larger dashed line. In the fully saturated condition, the hue may be represented by the angle on the horizontal axis. For example, at 60°, where red and blue are in equal parts, the resulting color is magenta. Similarly, at 180°, where red and green are in equal parts, the color is yellow.

Rather than describing a given color in terms of its RGB signals, an image may be described in terms of different coordinate systems. One widely used coordinate system utilizes the components Y, u and v. The "Y" component describes the luminance, or monochrome brightness, of the color. The chrominance or color information, is contained in the "u" and "v" signals. The matrix to transfer between the RGB and the Y, u and v coordinate systems is as follows:

$Y = 0.299\,R + 0.587\,G + 0.114\,B$ $u = 0.493\,(B-Y)$ and $v = 0.877\,(R-Y)$.

Figure 2:
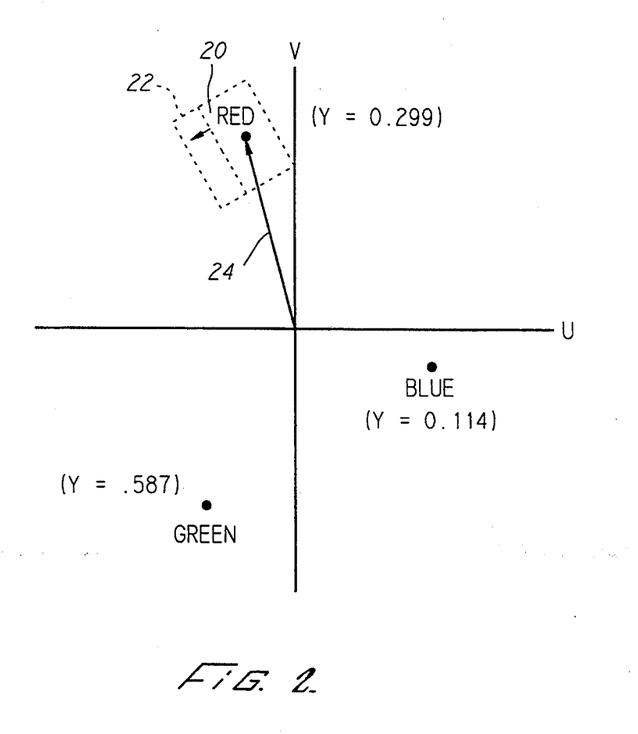
FIG. 2 shows a plan view of the chrominance (u and v) signals for RGB with the values of luminance (Y) in parenthesis.

FIG. 2 shows a plan view of the chrominance in the Y, u, v coordinate system, with the luminance value shown in parenthesis. For example, the color blue would be located at +0.114 units of Y, +0.436 units of u and −0.1 units of V. In prior color correctors, a region 20 would be defined around a starting hue. In the example, the region surrounds the color red. In performing secondary color correction, the colors within the region 20 would be shifted to a region 22, the amount being defined by the desired amount of color change.

However, substantial problems have arisen in conventional color correction. Most notably, when the hue is changed, the luminance and saturation values for the first hue are not necessarily the same as for the second hue. The saturation is defined to be the length of the vector 24 from the Y, u and v coordinate system. By way of example, the luminance value of fully saturated blue is 0.114, whereas for cyan it is 0.701. The ratio of these two luminance values is 6.15. Thus, if a colorist changed the hue from blue to cyan, and the luminance gain was not increased by the ratio of 6.15, the cyan would appear very dim and unnatural looking. In operation, the colorist needs to correct the luminance gain for every hue change performed.

Additionally, to merely change the hue, without regard to the luminance, nonsensical results may be obtained. For example, the indication may be of "negative" color, or color percentages greater than 100%, neither of which can exist in nature.

No satisfactory solution to this long standing and vexing problem has been proposed heretofore.

SUMMARY OF THE INVENTION

An improved method and apparatus for secondary color correction utilizes normalized color image signals. Of the three signals representing the color image, two are normalized as a function of the remaining variable. Color correction is performed on the normalized signals. After the color correction, the corrected signals are reconverted to the original non-normalized state.

In the preferred embodiment, the RGB signals are converted to the luminance (Y) and chrominance (u and v) signals. Preferably, the chrominance (u and v) are converted to polar coordinates of hue and saturation. In the most preferred embodiment, the color axis is rotated so as to orient the blue at 0° hue.

In operation, the luminance and saturation signals are normalized as a function of hue. In the most preferred embodiment, the luminance is normalized to a medium value, such as +0.5, and the saturation is normalized to unity for all values of hue of the fully saturated color sweep of FIG. 1. The normalization values may be calculated or looked up, such as from a look-up table, such as stored in a programmable read only memory (PROM). The normalized signals are then subject to color correction. The color corrected signals are then denormalized, utilizing the color corrected hue.

In the preferred embodiment, the normalized luminance is used for higher values of saturation. However, when the saturation values are low, the unnormalized value of luminance is utilized. Fading from one luminance to the other is performed.

In another aspect of this invention, the region of the image to be color corrected may be isolated utilizing overlapping regions. In the preferred embodiment, multiple regions may be set for various levels of color correction, thereby permitting better matching of an object than has been possible with a single highlighted region. Additionally, prioritization of color correction regions is utilized.

In yet another aspect of this invention, a test mode may be involved in which the portion of the image being corrected is highlighted or distinguished from areas not subject to correction. In the preferred embodiment, the region subject to correction may be replaced with black, or blanked as an aid in selection of the color range to be corrected.

Accordingly, it is a principal object of this invention to provide for improved color correction. It is yet a further object of this invention to provide for an improved color correction system in which the colorist need not change the color image values, such as luminance, after a correction.

It is yet a further object of this invention to provide for multiple correction regions on an image.

It is yet a further object of this invention to provide for overlapping color correction regions, with prioritization of the correction for various regions.

It is yet a further object of this invention to provide a test feature for secondary color correction which graphically indicates on the image the region to be corrected.

DETAILED DESCRIPTION OF THE INVENTION

Figure 3:
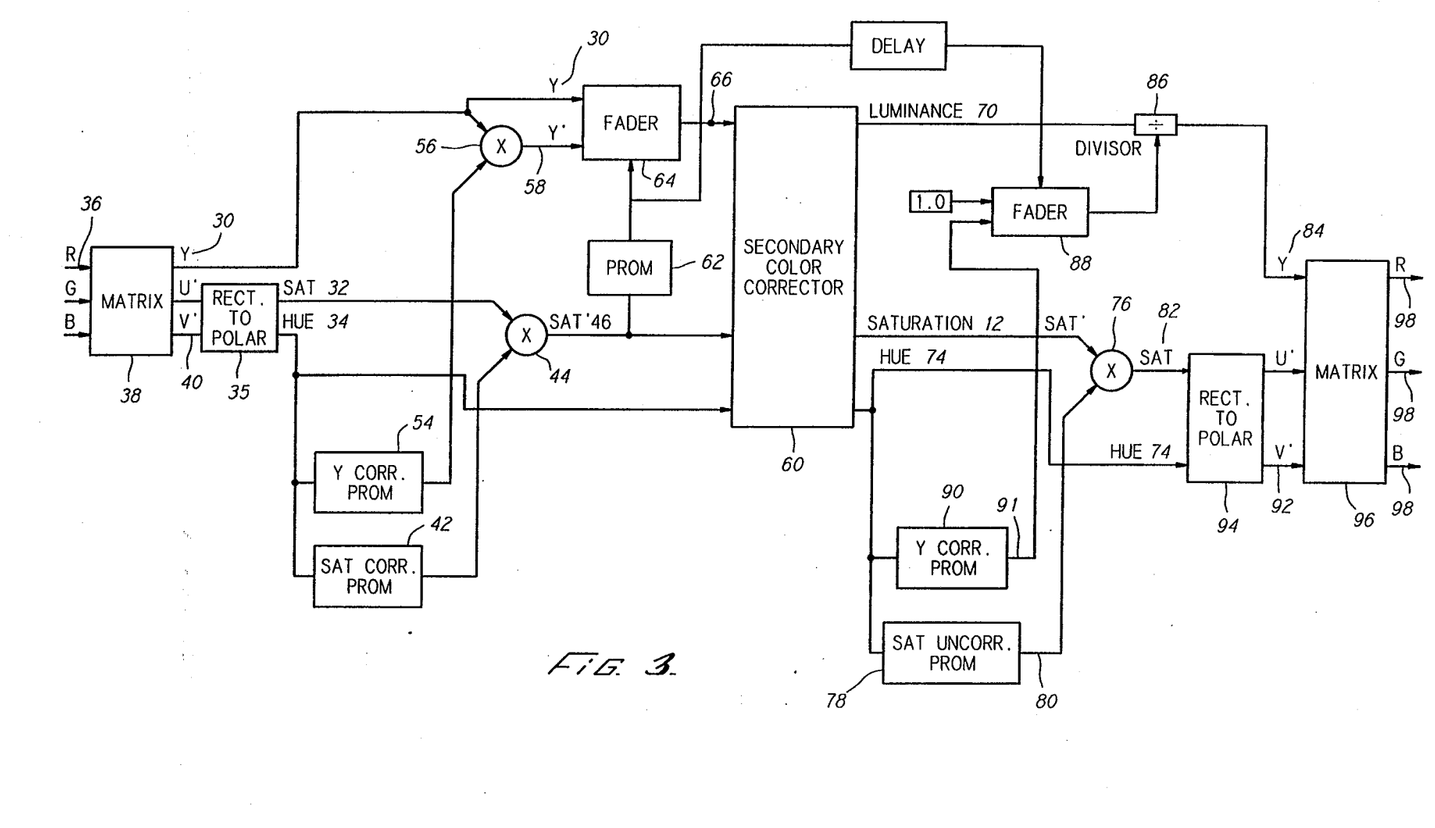
FIG. 3 shows a block diagram of the improved system.

FIG. 3 shows an overall block diagram of the system. In the preferred embodiment, the luminance Y signal 30 and the saturation signal 32 are normalized as a function of the hue signal 34. In the preferred embodiment, red, green and blue (RGB) signals 36 are subject to matrix conversion 38 to form the output luminance signal 30 and the chrominance signals u' and v' 40. The red, green and blue signals are related to the Y signal 30 and chrominance signal 40 by the following equations:

$$Y = 0.299\,R + 0.587\,G + 0.114\,B$$

$$u' = -0.5\,R - 0.5\,G + B \text{ and}$$

$$v' = 0.866\,R - 0.866\,G.$$

Figure 5:
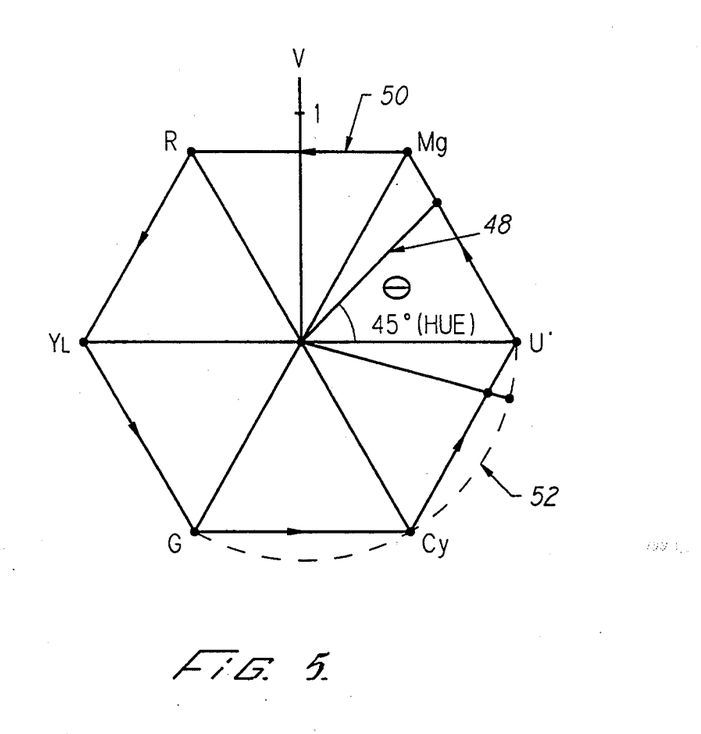
FIG. 5 shows a plan view of the rotated chrominance system (u' and v') as a function of hue.

The u' and v' chrominance signals 40 were optionally chosen such that the six fully saturated colors (blue, magenta, red, yellow, green and cyan) fall at 0°, 60°, 120°, 180°, 240° and 300° on a plot where u' is the x-axis and v' is the y-axis. Additionally, for convenience, the saturation value is then 1.0 for each of the six fully saturated colors. The chrominance signals 40 are converted to polar coordinates via converter 35. As shown in FIG. 5, the hue comprises the angle theta from the u' axis, and the saturation is the radius. As shown, the saturation equals 1 for the 6 colors and fall at the specified angles.

Returning to FIG. 3, the saturation signal 32 is normalized as a function of the hue signal 34. In the preferred embodiment, the values of the saturation correction as a function of hue are stored in the saturation correction PROM 42. Alternatively, these values may be calculated as needed, or stored in any sort of look-up table. The saturation signal 32 is multiplied by multiplier 44 times the output from the saturation correction PROM 42 to form a saturation prime signal 46.

Figure 7:
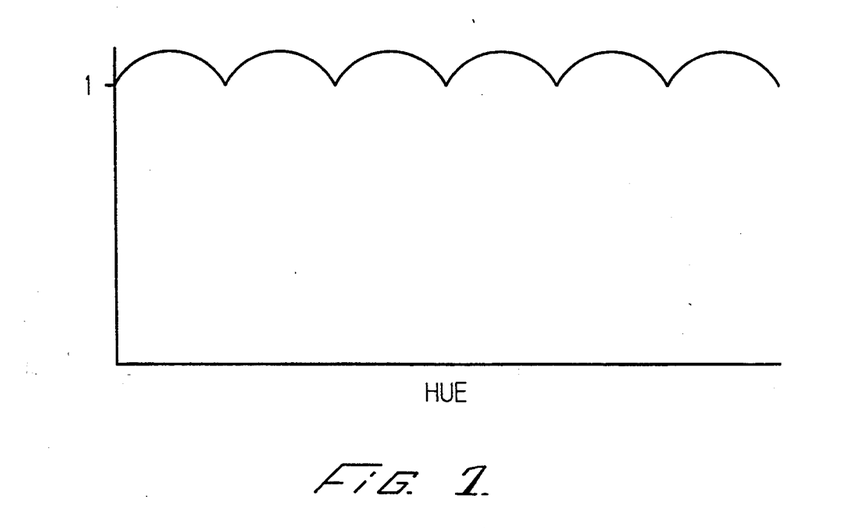
FIG. 7 shows a plot of saturation correction as a function of hue.

FIG. 7 shows the content of the saturation correction PROM 42 as a function of hue 34. As can be seen in FIG. 5, the normalization of the saturation signal 32 converts the vector 48 from the hexagon 50 to the circle 52.

Figure 6:
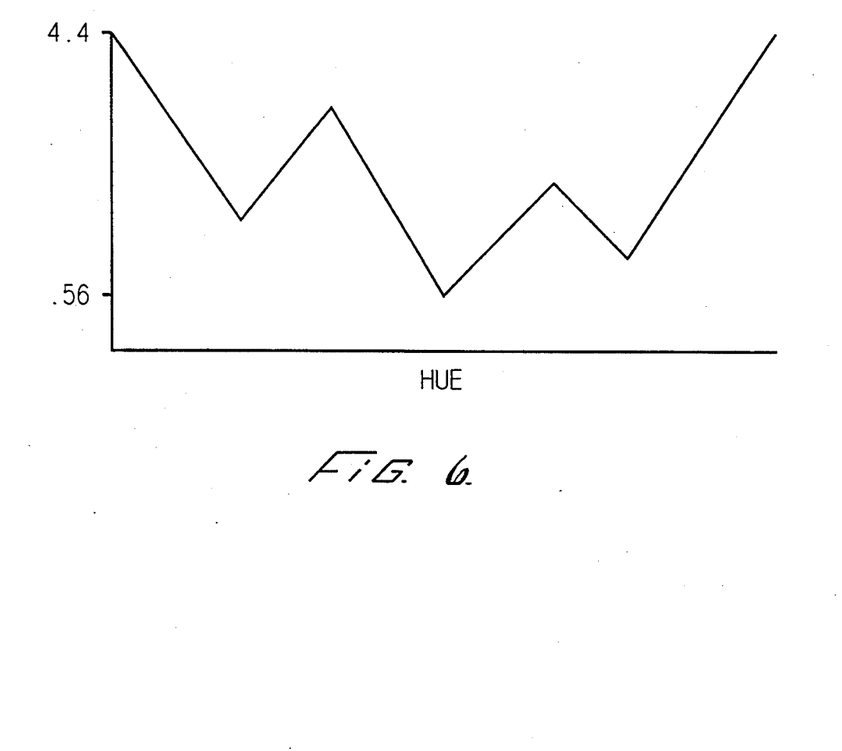
FIG. 6 shows the luminance Y correction as a function of hue.

Returning to FIG. 3, the luminance Y signal 30 is normalized as a function of the hue signal 34. The normalization factor is preferably taken from a list, such as a Y correction PROM 54. The Y correction PROM 54 receives the hue signal 34 as an input, and outputs the Y normalization value appropriate for that hue signal 34. The contents of the Y correction PROM shown in FIG. 6. The Y correction factor output from the PROM 54 is multiplied at multiplier 56 times the luminance Y signal 30 to form a luminance prime (Y') signal 58.

Selection is made between the luminance Y signal 30 and the luminance prime Y' signal 58 to provide input to the secondary color corrector 60. In the preferred embodiment, a PROM 62 receives the saturation prime signal 46 as its input, and outputs a signal of the form shown, for example, in FIGS. 9A and 9B. A fader 64 receives the output of the PROM 62 as the basis for selection between the luminance Y signal 30 and the luminance prime Y' signal 58. Generally, as the value of the saturation signal 32 and saturation prime signal 46 decrease towards 0, the hue signal 34 becomes unreliable, and subject to noise fluctuations. As a result, if the hue signal 34 were to fluctuate as an input to the Y correction PROM 54, the normalized value of the luminance signal 30 may be in error. Accordingly, for lower values of saturation signal 32 or saturation prime 46, the fader 64 selectively utilizes the uncorrected luminance Y signal 30 in favor of the normalized luminance prime Y' signal 58.

Figure 9A:
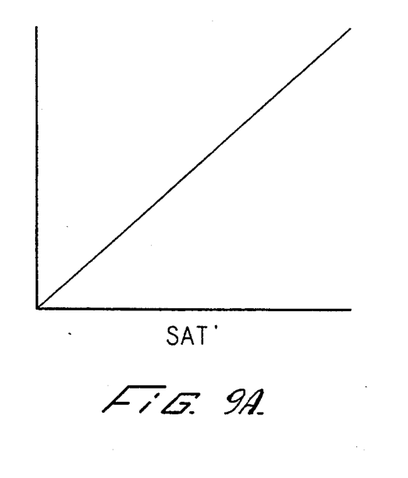
FIG. 9A shows a first transfer function for the fader as a function of saturation.
Figure 9B:
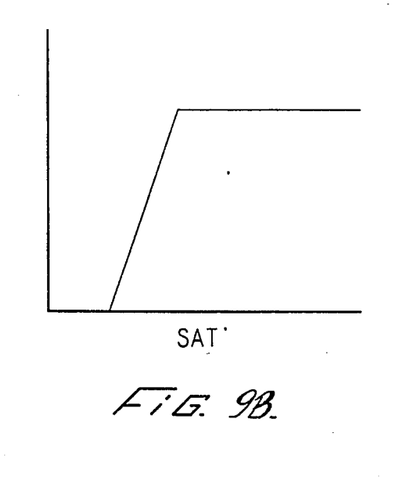
FIG. 9B shows an alternate transfer function for the fader as a function of saturation.

As shown in FIG. 9A, a linear transfer from the normalized luminance prime signal 58 to the unmodified luminance Y signal 40 may be utilized. Alternatively, a transfer function as shown in FIG. 9B may be used as the fader 64 such that at low values of the saturation prime signal 46 the normalized luminance prime (Y') signal 58 is not used at all. The secondary color corrector 60 is supplied with the output of the fader 64, constituting the uncorrected luminance signal at node 66, the normalized saturation prime signal 46 and the hue signal 34. The secondary color corrector 60 may then operate on these input signals in a conventional manner. The output of the secondary color corrector 60 comprise the color corrected normalized luminance signal 70, the color corrected normalized saturation signal 72 and the color corrected hue signal 74.

Figure 8:
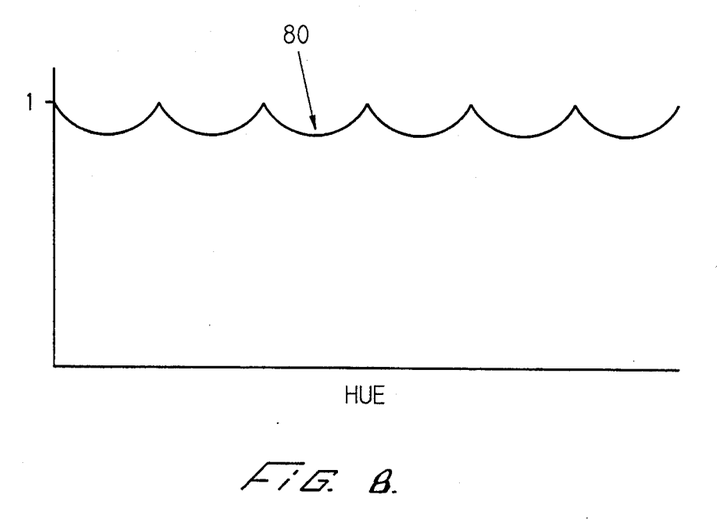
FIG. 8 shows a plot of saturation uncorrection as a function of hue.

The saturation signal 72 is then multiplied in multiplier 76 times a value which denormalizes the saturation for the value appropriate at the hue signal 74. In the preferred embodiment, the information is taken from a saturation uncorrection PROM 78, which receives as its input the hue signal 74 and provides as its output the saturation uncorrection signal 80. FIG. 8 shows the saturation uncorrection values as a function of hue signal 74. Generally, these values constitute the inverse of the values shown in FIG. 7. The output of multiplier 76 results in a color corrected unnormalized saturation signal 82.

Figure 4:
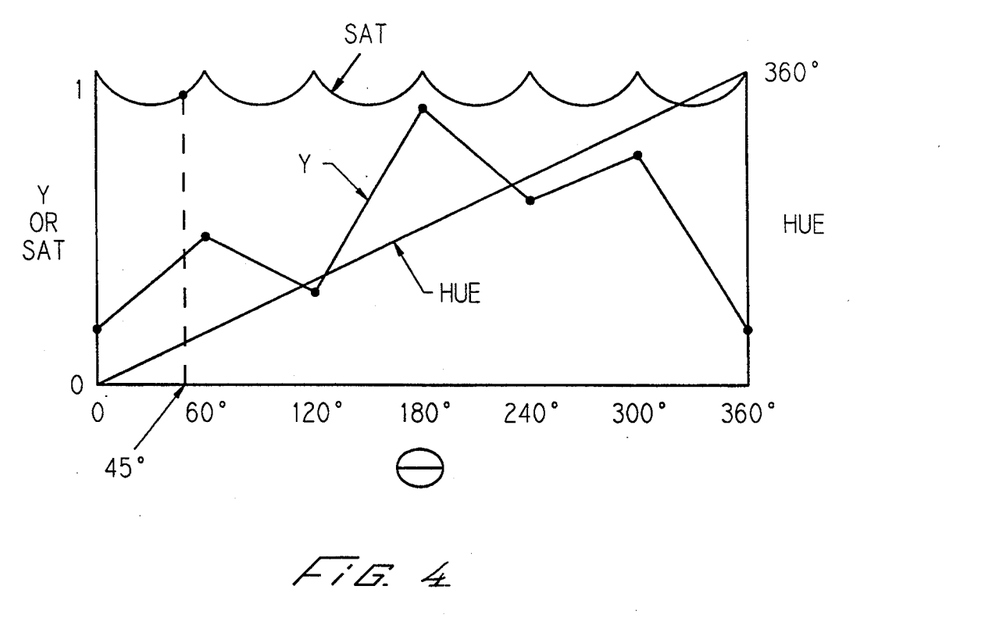
FIG. 4 shows a plot of the luminance Y, saturation and hue outputs of a fully saturated color sweep as a function of color coordinate angle.

Returning to FIG. 3, the color corrected normalized luminance signal 70 is then converted to a non-normalized but color corrected luminance signal 84 by divider 86. Optionally, the divider 86 may be formed from a multiplier utilizing inverted numerical inputs. A fader 88 receives as input the output of a Y correction PROM 90. The Y correction PROM 90 outputs the luminance correction value 91, which is the same as the luminance correction values of FIG. 6 since the divider 86 provides the inverse function. The Y correction PROM 90 receives the color corrected hue signal 74 as its input. FIG. 4 shows the values of luminance Y, saturation SAT and hue as a function of angle theta (FIG. 5) for all the possible fully saturated colors of FIG. 1. The color corrected luminance signal 84, the saturation signal 82, and the hue signal 74 may optionally be converted to another coordinate system, for example, the color corrected saturation signal 82 and hue signal 74 may be converted to chrominance signals u' and v' signals 92 via polar to rectangular converter 94. As a optional final step, the color corrected luminance signal 84, and the color corrected chrominance signals u' and v' 92 may be converted to RGB via matrix 96. The matrix 96 would ordinarily constitute the inverse of matrix 38. The RGB signals 98 constitute the color corrector output signals having the correct luminance.

Figures 10, 10B:
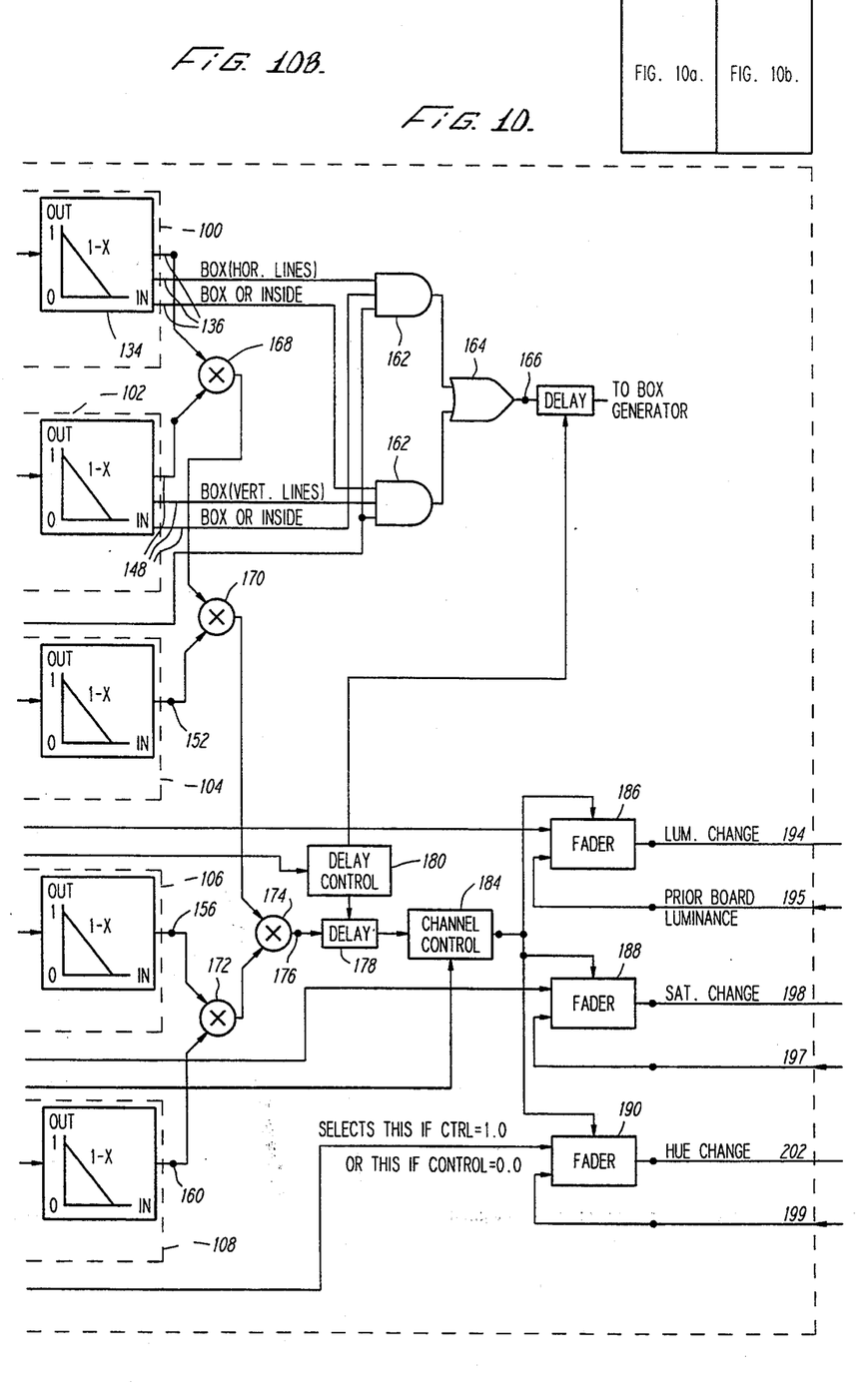
FIG. 10 shows the detailed schematic for one channel correction.
Figure 10A:
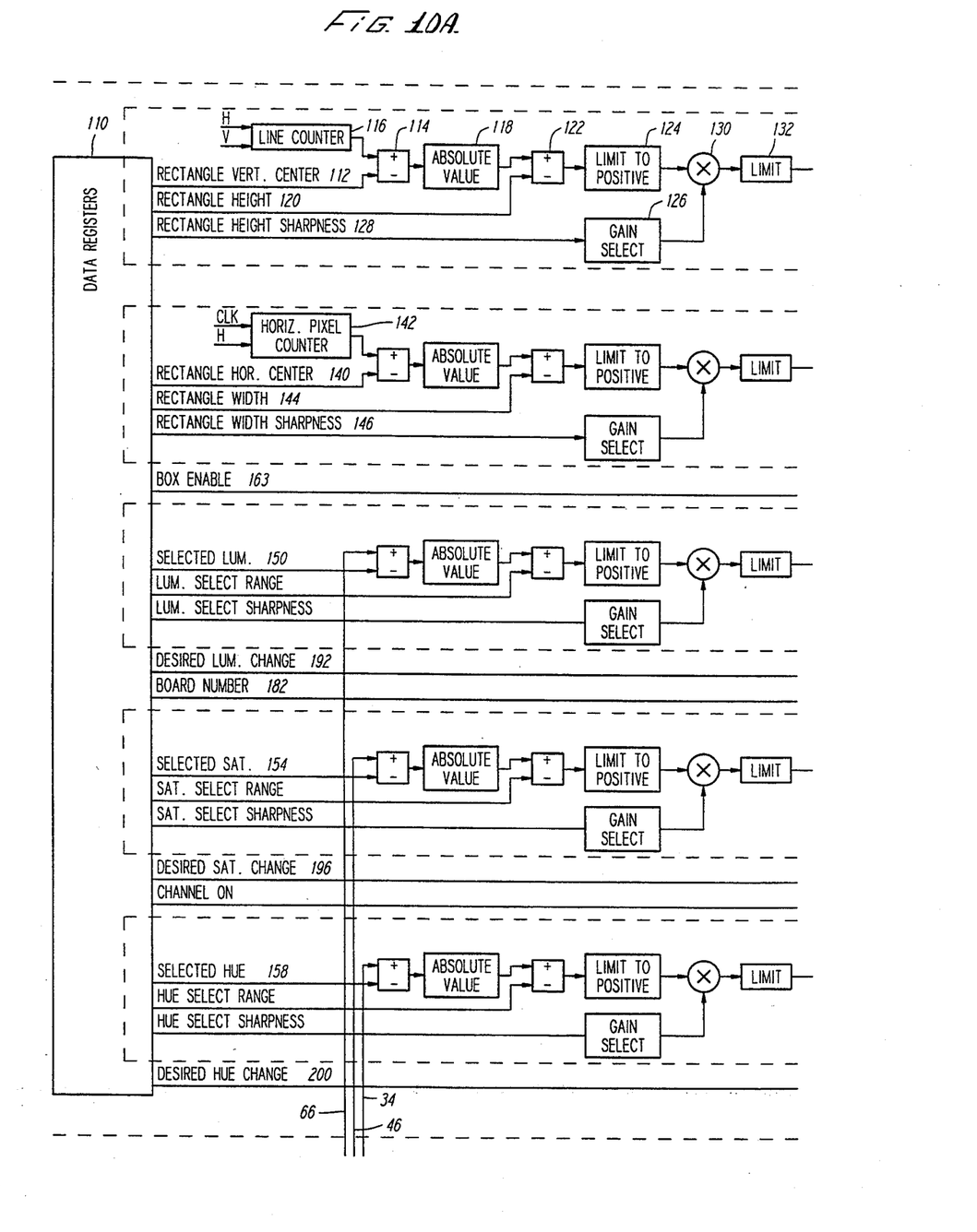

FIG. 10 shows a more detailed schematic for the diagram shown in FIG. 3. Specifically, FIG. 10 shows a detailed schematic for a color correction channel. Multiple channels may be utilized. There is no inherent limit on the maximum number of channels. In the preferred embodiment, four channels are used, permitting four overlapping, prioritized color correction regions.

The circuits may be implemented in any desired technology, whether analog or digital, or a combination thereof. Additionally, one or more computing units, such as microprocessors, may be programmed to perform many of these steps or processes required herein.

FIG. 10 includes five functional regions. The image region is defined by the vertical region generator 100 and the horizontal region generator 102. The change to the luminance is effected by the luminance correction circuitry 104. The change to the saturation is effected by the saturation change circuit. 106. The hue is changed by hue circuit 108. Data registers 110 hold information relating to the color correction to be performed as well as to the location of the image regions.

The vertical region generator 100 receives the rectangle vertical center information 112 and subtracts this via subtracter 114 from the current line count specified by the line counter 116. The absolute value 118 is taken and subtracted from the rectangle height 120 in subtracter 122. This number is limited to positive 124. In this way, the difference from the rectangle's vertical center 112 to the current line counter value 116 is determined as an absolute value, and compared to the rectangle height 120 to determine whether the line counter position 116 is inside of or outside of the image correction region. Optionally, a gain select 126 uses rectangle height sharpness information 128 in multiplier 130. An optional limiter 132 receives the output of multiplier 130. The input to the 1-x generator is an error signal. The correction is faded to zero as the color or region selection error rises. The output 136 from the vertical region generator circuitry 100 provides an indication whether the vertical position as specified by the line counter 116 is within or without the region for color correction.

The horizontal region generator circuit 102 works in a similar manner. Here, the rectangle horizontal center information 140 is compared against the current horizontal pixel counter 142 information. The rectangle width 144 and rectangle width sharpness 146 are utilized in a manner as described with the vertical region generator circuit 100. In like manner, the output 148 of the horizontal image generator circuit 102 provides an indication of whether the current pixel is within or without the region for color correction in the horizontal direction.

The luminance correction circuit 104 receives as input the selected luminance 150 and compares against the luminance Y 66. The signals are processed as described in detail with respect to the vertical region generator circuit 100, resulting in output 152.

The saturation change circuit 106 utilizes the selected saturation 154 in comparison with the saturation prime (SAT') signal 46 to generate output 156 in a manner as described with respect to vertical region generator circuit 100.

Similarly, the hue circuit 108 receives the selected hue 158 as input and compares it to the hue 34 in a manner similar to that described for the vertical region generator circuit 100. An output 160 results.

AND gates 162 receive as their input the box enable signal 163, the output 136 of the vertical region generator circuit 100 and the output 148 of the horizontal region generator circuit 102. OR gate 164 receives the output of AND gates 162. The output of OR gate 164 is used to add a visual box in the picture as an indication of whether the current position is subject to correction and comprises the box signal at node 166. The output 136 of the vertical region generator circuit 100 is multiplied times the output 148 of the horizontal region generator circuit 102 in multiplier 168. The output of multiplier 168 is multiplied times the output 152 of the luminance correction circuit 104 in multiplier 170. The output 156 of the saturation change circuit 106 is multiplied times the output 160 of the hue circuit 108 in multiplier 172. The output of multiplier 170 and the output of multiplier 172 are multiplied together in multiplier 174 resulting in an output at node 176. In operation, the multipliers act to AND together the five selection criteria. Output 176 is 1, that is, selected, only if the pixel is within the box, and the proper luminance, saturation and hue are selected.

The output at node 176 is subject to delay 178 under delay control 180, which in turn is under control of board number 182. The output node 176 after delay 178 is subject to channel control 184 which is passed to fader 186, fader 188 and fader 190. The desired luminance change 192 is provided as input to fader 186 to result in luminance change output 194. The desired saturation change 196 is provided as input to fader 188 to result in output saturation change 198. The desired hue change 200 is provided as input to the fader 190 to provide output hue change 202. The luminance change 194 is multiplied with the luminance signal 66 to provide the corrected luminance signal 70. The saturation change output signal 198 is multiplied with the saturation prime (SAT') signal 46 to provide the corrected saturation prime signal 72. The hue change 202 is combined with the hue signal 34 to provide the output hue 74.

Each of faders 186, 188 and 190 receive as one of their inputs the value of the luminance change 194 and the saturation change 198 or hue change 202 from a higher channel board output (not shown). Thus, for example, the luminance change output 194 from a higher channel board is provided as input to the fader 186 on FIG. 10. If the channel shown in FIG. 10 does not change the color of this pixel, the next higher channel is permitted to change the color. By such cascading of control, the color correction can occur at the board which takes control or at the point where there are no more boards. The lowest level board for which there is a change will control.

Figure 11:
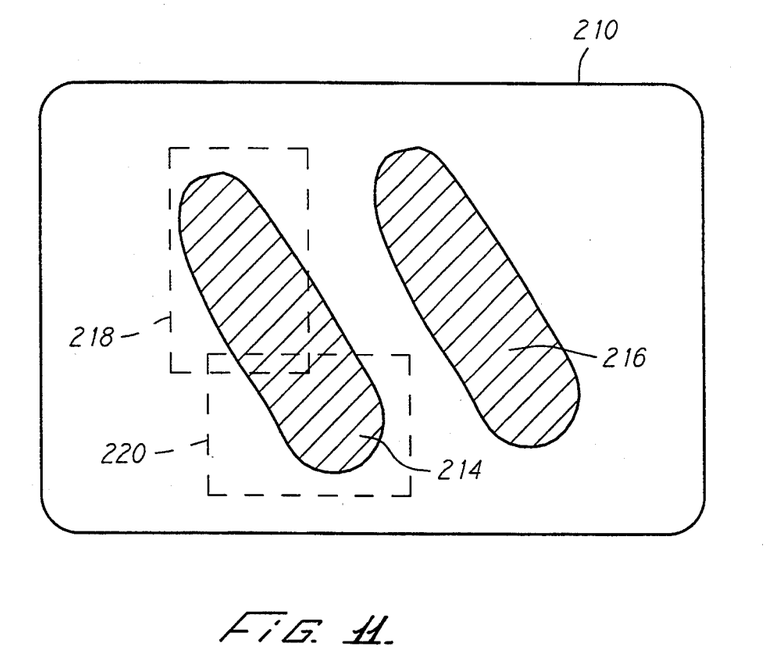
FIG. 11 shows a diagram with overlapping color correction boxes.

FIG. 11 shows a representation of images on a monitor 210 to which color correction is to be performed. Assume that images 214 and 216 are of the same color, but that it is desired by the colorist only to change the color of image 214. The image 214 may be covered by rectangles 218 and 220. Each rectangle identifies the area for which color correction is to be performed. By overlapping the two rectangles 218 and 220, "L" shaped or diagonal images may be more easily identified for color correction apart from the totality of the image. The region within rectangle 218 is controlled by one channel of the color correction system and the region within the box 220 is colored by another channel within the color correction system. By prioritizing the level of color correction, the overlap regions between the rectangles 218 and 220 are corrected for only once.

Optionally, blanking may be provided for blocking out the area within the rectangles 218 and 220 which are of the selected hue for color correction. Further, the rectangles 218 and 220 may be indicated on the display 210 by showing the border. By use of these techniques, the colorist is more easily able to determine the region in which color correction is to be performed, and to clearly identify the hue subject to color correction.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. A method for color correction of a signal having saturation, luminance and hue values comprising the steps of:
   a) receiving the saturation, luminance and hue values,
   b) normalizing the saturation as a function of the hue value,
   c) normalizing the luminance as a function of the hue value,
   d) performing secondary color correction on the hue value, and the normalized saturation and luminance values,
   e) denormalizing the secondary color corrected normalized luminance value, and
   f) denormalizing the secondary color corrected normalized saturation value,
   wherein the color corrected hue value, the denormalized secondary color corrected normalized luminance value and the denormalized secondary color corrected normalized saturation value comprise a color corrected signal.

2. The color correction method of claim 1 wherein the saturation, luminance and hue values are derived from RGB signals.

3. The method of claim 2 wherein after step f), the color corrected hue value, the denormalized secondary color corrected normalized luminance value and the denormalized secondary color corrected normalized luminance value and the denormalized secondary color corrected normalized saturation value are converted to RGB.

4. The method of claim 2 wherein the RGB signals are matrix converted to a luminance and chrominance values, followed by a rectangular to polar conversion of the chrominance values to the hue and saturation values.

5. The method of claim 4 wherein the matrix conversion is to chrominance values in the u', v' coordinate system.

6. The method of claim 1 wherein step b) the saturation is normalized by multiplying the saturation times a correction value as a function of hue.

7. The method of claim 6 wherein the correction value is retrieved from a list of correction values.

8. The method of claim 7 wherein the list is stored in a memory.

9. The method of claim 1 wherein step c) the normalization includes multiplication of the luminance times a correction value as a function of hue.

10. The method of claim 9 wherein the correction value is retrieved from a list.

11. The method of claim 10 wherein the list is stored in memory.

12. The method of claim 1 wherein prior to step d), the luminance is faded between the normalized luminance and the luminance.

13. The method of claim 12 wherein the fading is a function of normalized saturation.

14. The method of claim 13 wherein the fading function is linear.

15. The method of claim 13 wherein the fading function utilizes the luminance value for low values of saturation.

16. The method of claim 1 wherein step f) the saturation is multiplied by an uncorrection value as a function of hue.

17. The method of claim 1 wherein in step e) the luminance is divided by the correction value as a function of hue.

18. An improved color corrector system for use with a secondary color corrector, the secondary color corrector converting a luminance input, a saturation input and a hue input into a luminance output, a saturation output and a hue output, the system comprising:
- an input for a luminance value,
- an input for a saturation value,
- an input for a hue value, and
- a luminance normalizer connected to the input for a luminance value and the input for a hue value, the luminance normalizer having an output connected to the luminance input of the secondary color corrector.

19. The improved color corrector system of claim 18 further including a saturation normalizer connected to the input for a saturation value and the input for a hue value, the saturation normalizer having an output connected to the saturation input of the secondary color corrector.

20. The improved color corrector system of claim 19 wherein the saturation normalizer includes a saturation correction table and a multiplier.

21. The improved color correction system of claim 20 wherein the saturation correction table is a programmable read only memory.

22. The improved color corrector system of claim 18 wherein tile luminance normalizer includes a luminance correction table arid a multiplier.

23. The improved color corrector system of claim 22 wherein the luminance correction table is a programmable read only memory.

24. The improved color correction system of claim 18 further including a fader having one input connected to the input for the luminance value and another input connected to the output of the luminance normalizer, the output of the fader connected to the luminance input of the secondary color corrector.

25. The improved color correction system of claim 24 wherein the fader is controlled by the output of the saturation normalizer.

26. The improved color correction system of claim 25 further including a transfer function generator connected to the output of the saturation normalizer and the input of the fader.

27. The improved color correction system of claim 26 wherein the transfer function is stored in a programmable read only memory.

28. The improved color correction system of claim 18 further including a converter to change an input RGB signal to said luminance, saturation and hue values.

29. The improved color correction system of claim 18 further including:
- a luminance denormalizer connected to the luminance output of the secondary color corrector, having an output connected to an output for the color corrector luminance values.

30. The improved color correction system of claim 19 further including:
- a saturation denormalizer connected to the saturation output of the secondary color corrector, having an output connected to an output for the color corrected saturation value.

31. A method for color correction of a video signal including at least a hue value and a luminance value comprising the steps of:
   a) receiving the hue and luminance values,
   b) normalizing the luminance as a function of hue,
   c) performing color correction on at least the hue value and the normalized luminance value, and
   d) denormalizing the color corrected normalized luminance value, wherein the color corrected hue value and the denormalized color corrected normalized luminance value are components of a color corrected signal.

32. The method of claim 31 wherein the normalizing of the luminance includes multiplication of the luminance values times a correction value as a function of hue.

33. The method of claim 31 wherein the correction value is retrieved from a list.

34. The method of claim 33 wherein the list is stored in memory.

* * * * *